Jan. 24, 1956     H. L. GADDIS ET AL     2,731,709
METHOD OF MAKING INTERNALLY FINNED HEAT EXCHANGER TUBES
Filed Sept. 18, 1950

INVENTORS
HUGH L. GADDIS
GLENN W. MYERS
ORAL S. WELSH
BY Bosworth & Sessions
ATTORNEYS.

United States Patent Office 2,731,709
Patented Jan. 24, 1956

2,731,709
METHOD OF MAKING INTERNALLY FINNED HEAT EXCHANGER TUBES

Hugh L. Gaddis, Cleveland Heights, Glenn W. Myers, North Ridgeville, and Oral S. Welsh, Elyria, Ohio, assignors to Brown Fintube Company, Elyria, Ohio, a corporation of Ohio Application September 18, 1950, Serial No. 185,418

4 Claims. (Cl. 29—157.3)

This invention relates to internally finned tubes and to a method of making the same.

Tubes with internal fins to provide extended surface area are highly useful in many installations, for example, for use as fire tubes in domestic heating boilers. Because of the expense of manufacture of such tubes and in some instances the unsatisfactory characteristics of the completed tubes, internally finned tubes heretofore have not had extended use. The present invention has for its general objects the provision of internally finned tubes in which the difficulties with previous types of tubes are overcome and the provision of an efficient and economical method of making such tubes.

Briefly, according to the preferred method, internally finned heat exchange tubes are provided by assembling a plurality of channel section fin members on a polygonal supporting member having a number of sides equal to the number of channel members; the base portions of the channel members engage the sides of the polygonal supporting member and the edges of the base portions of the channels on adjacent sides of the supporting member are in contact with each other. The assembly so produced is then introduced into a tube by pressing or driving the parts together with the outer edges of the fins firmly engaging the inner surface of the tube. Then the supporting member is removed leaving the channel members supported within the tube with the outer edges of the fins held against the inner surface of the tube solely by the engagement between the edges of the base portions of adjacent channels. The assembly is completed by brazing the fin members to the tube. This produces an internally finned tube in which the fins are bonded to the tube by alloy bonds of good heat conducting characteristics and in which there are no supporting members for the fins other than the tube. The central portion of the tube remains open for the passage of fluid therethrough and the finned portions of the channels are spaced apart by the width of the bases of the channels; hence, there is no undue crowding of the inner portions of the fins and pressure drop through the tube is held at a minimum.

Figure 1:
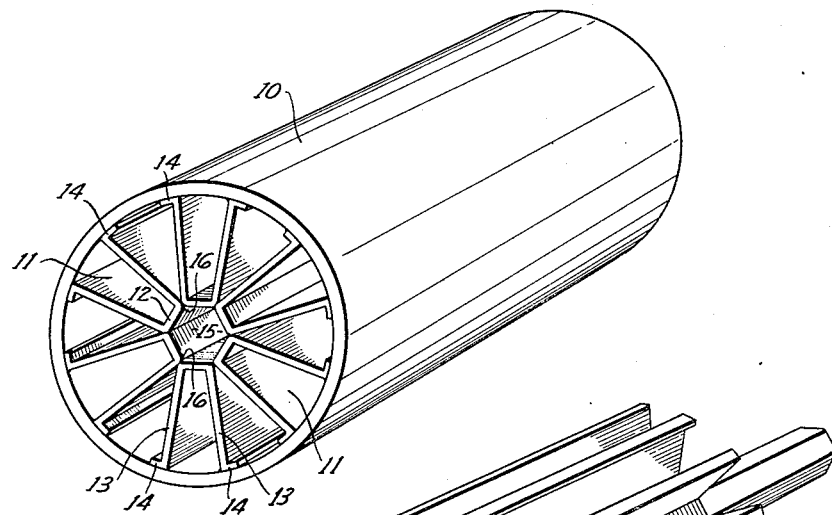
Figure 2:
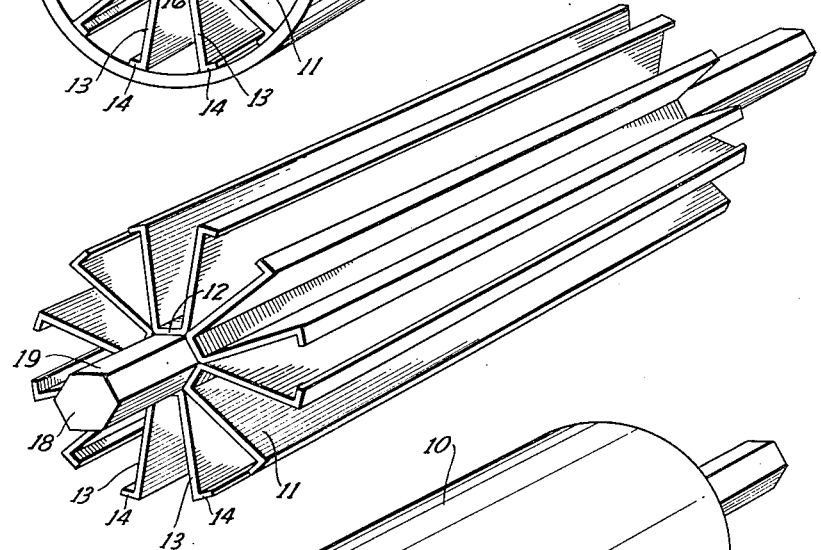
Figure 4:
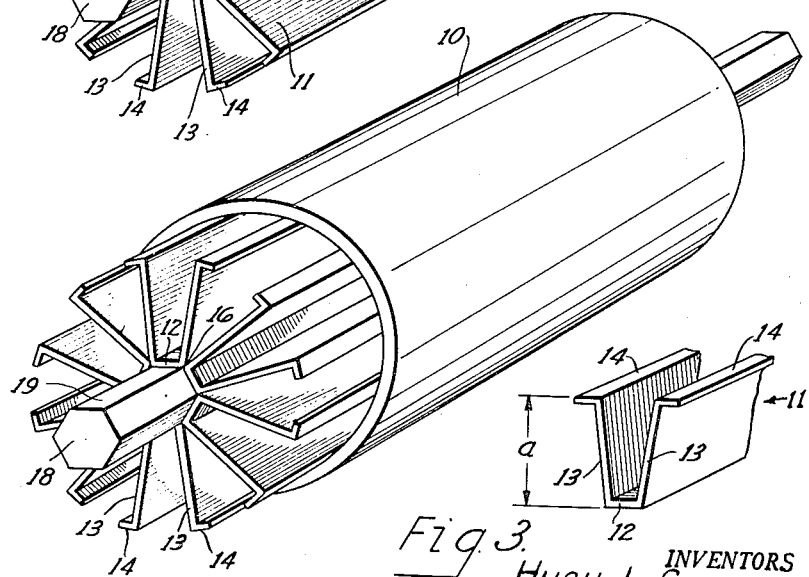
Figure 3:
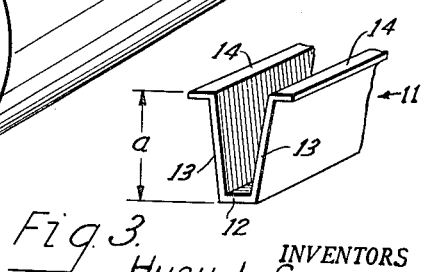

Referring now to the drawings, Figure 1 is a perspective view of a preferred form of an internally finned tube made according to our invention; Figure 2 is a perspective showing the assembly of fin members and a supporting bar prior to introduction into the tube; Figure 3 is a detail of one of the channels; and Figure 4 illustrates the step of insertion of the assembly of fin members and supporting bar into the tube.

An internally finned tube embodying our invention preferably comprises a tube 10 and a plurality of channel section fin members 11 disposed within the tube. Each channel section fin member comprises a base portion 12 and fin portions 13. Preferably, each fin portion terminates in a longitudinally extending laterally turned flange 14 which constitutes the outer edge of the fin and which in the completed tube engages and is bonded to the interior surface of the tube 10.

The flanges 14 are provided for the reason that the construction of the tube requires that the dimension indicated by $a$ in Figure 3 between the bottom of the base portion 12 and the top of flanges 14 be held accurately to rather close tolerances. By providing flanges 14 the dimension $a$ can be determined accurately by the construction of the rolls which bend the strip material utilized to make the channels into the desired channel section and slight variations in the width of the original strip will not affect this dimension; thus the dimension $a$ can be held within close tolerances. If such flanges are not provided it is necessary to maintain the width of the strip with a high degree of accuracy and to center the rolls accurately with respect to the strip to insure that the fin portions will be of equal and uniform length.

The proportions of the channel section members 11 are selected so that when the desired number of channels are secured within the tube as shown in Figure 1 the base portions 12 of the several channels define a polygnal opening 15 at the center of the tube. In the example shown the opening is hexagonal, six channel members being employed. Those skilled in the art, however, will appreciate that greater or lesser numbers of channel members can be utilized if desired. The width of the base portions 12 is such that the edges of the base portions where the fin portions extend therefrom abut the edges of the base portions of adjacent channels as indicated at 16. This engagement between edges of the bases firmly supports the channels against external forces and thus the channels reinforce the tube against external pressures.

In the completed tube the flanges 14 are preferably bonded to the inner surface of the tube by an alloy bond in order to obtain good heat transfer. The contacting edges of the base portions may be bonded by a similar bond in order to improve the mechanical strength of the assembly but such bonding is not essential. When ferrous tubes are employed, copper may be utilized as the bonding material. With non-ferrous metals suitable brazing alloys or solders may be employed depending upon the service to which the tube is to be put.

In producing the tube shown in Figure 1, the first step is to assemble the desired number of channel members (six in the present example) with a supporting rod 18 which is in the form of a polygon having a number of sides equal to the number of channel members and with the faces 19 of the rod substantially equal to the width of the bases of the channels. Such an assembly is shown in Figure 2 from which it will be seen that when the channels are positioned on the rod 18 the edges of the base portions 12 are in contact with each other as shown at 16 in the same manner that they make contact with each other in the completed tube.

The channel members are temporarily held on the rod 18 by any convenient means such as encircling wires or bands or small areas of solder of low melting temperature. With the channels so held on the rod, the assembly of Figure 2 is then introduced into the tube 10 as shown in Figure 4. This operation may be carried out in a small press. After the fins are properly positioned within the tube the supporting rod 18 is withdrawn from the assembly, leaving the fin members in the tube with the flanges 14 supported firmly in engagement with the inner surface of the tube by the engagement between the edges of the base portions of the channels along the lines 16.

In order to complete the assembly, bonding metal is supplied to the contacting areas of the parts that are to be bonded together. Where a copper brazing operation is employed, copper paste composed of finely divided copper or copper oxide powder in a liquid or paste vehicle is introduced into the tube and caused to flow so that a fillet of paste is provided at each contact point between the flanges 14 and the tube and between the edges of the bases of adjacent channels if it is desired to bond these edges together. The tube is then passed through a brazing furnace having a reducing atmosphere such as provided by hydrogen or a cracked hydrocarbon gas and raised to a temperature of about 2100 degrees Fahrenheit.

At the desired temperature the copper becomes fluid and penetrates between the contacting surfaces of the parts by capillary attraction. Upon subsequent cooling of the assembly the copper is found to have alloyed with the underlying ferrous materials creating a mechanically strong bond having excellent heat transfer characteristics. The copper bond is able to withstand the temperatures ordinarily encountered in domestic fire tube boilers and in similar situations. Where lower surface temperatures are contemplated, it is possible to use brazing alloys and solders of lower melting points as the bonding medium.

Internally finned tubes of this kind are claimed in divisional application Serial No. 290,054, filed May 26, 1952, under the title "Internally Finned Tube."

From the foregoing description of a preferred form of our invention it will be seen that we have provided a method whereby efficient heat exchange tubes having internal fins can be manufactured with comparatively simple equipment and at reasonable cost. Because the channel section members are self supporting by reason of their engagement with each other, no central support is required for these members in the completed tube; hence, the supporting bar 18 can be used repeatedly in manufacturing tubes, and the elimination of a supporting member in the completed tube results in a reduction in cost and in a more efficient structure from the standpoint of heat exchange and pressure drop.

Those skilled in the art will appreciate that various changes and modifications may be made in the preferred form of the invention described herein without departing from the spirit and scope of the invention. The appended claims are intended to cover the patentable aspects of the invention.

We claim:

1. A method of making internally finned heat exchanger tubes comprising the steps of inserting separately formed fin members each having a base and at least one fin portion projecting from the base into a tube so that the fin members extend longtudinally of the tube with the outer edges of the fin portions in firm contact with the internal surface of the tube, the fin portions extending inwardly therefrom and each edge of each base making contact with an edge of the base of an adjacent fin member, temporarily supporting the fin members when inserting them into the tube and removing such support when the fin members have been located in their final positions in the tube, leaving said fin members supported solely by the contact of the edges of the bases thereof, and thereafter brazing the outer edges of the fin portions to the tube while said fin members are supported solely by said contact of the edges of the bases thereof.

2. The method of making internally finned heat exchanger tubes comprising the steps of assembling a plurality of separately formed open channel section fin members on a supporting member with the base portions of the channel members in contact with the supporting member, the edges only of the bases of adjacent channel members in contact with each other, and the fin portions of the channel members extending outwardly therefrom, inserting the assembly into a tube with the outer edges of the fin portions of the channel members in firm contact with the internal surface of the tube, removing the supporting member, leaving the outer edges of the fin portions firmly supported against the tube solely because of the contact between the edges of the bases of adjacent channel members and thereafter, while said channel members are so supported, brazing the outer edges of the fin portions to the internal surface of the tube.

3. The method of making internally finned heat exchanger tubes comprising the steps of temporarily supporting a plurality of separately formed open channel section fin members on a supporting member of polygonal cross-section having a number of sides equal to the number of channel members and with the base portions of the channel members in contact with the sides of the supporting member and only the edges of the bases of adjacent channel members in contact with each other, and with the fin portions of the channel members extending outwardly therefrom, inserting the assembly into a tube with the outer edges of the pin portions of the channel members in firm contact with the internal surface of the tube, removing the supporting member, leaving the outer edges of the fin portions firmly supported against outer edges of the fin portions firmly supported against the tube solely because of the contact between the edges of the bases of adjacent channel members and thereafter, while said channel members are so supported, brazing the outer edges of the fin portions to the internal surface of the tube.

4. The method of making internally finned heat exchanger tubes which includes the steps of assembling a plurality of separately formed open channel section fin members each having a base and two fin portions on a supporting member of polygonal cross-section having a number of sides equal to the number of channel members with the bases of the channel members engaging the sides of the polygonal supporting member, the fin portions extending outwardly, and the edges of the bases of channel members on adjacent sides of the supporting member in contact with each other, inserting the assembly so produced into a tube with the outer edges of the fin portions of the channel members in firm contact with the internal tube, removing the supporting member and leaving the channel members supported within the tube with the outer edges of the fin portions held against the inner surface of the tube solely by the engagement between the edges of the bases of adjacent channel members and thereafter, while said channel members are so supported, brazing the fin portions to the tube and the contacting edges of the bases to each other.

References Cited in the file of this patent

UNITED STATES PATENTS

| | | |
|---|---|---|
| 637,628 | Mackay | Nov. 21, 1899 |
| 1,141,067 | Lloyd | May 25, 1915 |
| 1,339,385 | Gayer | May 11, 1920 |
| 1,929,540 | Trane | Oct. 10, 1933 |
| 2,004,389 | Jones | June 11, 1935 |
| 2,059,992 | Gould | Nov. 3, 1936 |
| 2,261,136 | Brown | Nov. 4, 1941 |
| 2,352,501 | Slavicek | June 27, 1944 |
| 2,362,985 | Brown | Nov. 21, 1944 |
| 2,386,159 | Elder | Oct. 2, 1945 |
| 2,483,454 | Brown | Oct. 4, 1949 |
| 2,500,501 | Trumpler | Mar. 14, 1950 |
| 2,572,593 | Brown | Oct. 23, 1951 |